(12) United States Patent
Baus et al.

(10) Patent No.: US 8,834,608 B2
(45) Date of Patent: Sep. 16, 2014

(54) PROCESS AND DEVICE FOR SEPARATING OFF SOLID PARTICLES FROM A WATER PHASE

(75) Inventors: Michael Baus, Graefelfing (DE); Gerhard Alzner, Munich (DE)

(73) Assignee: Linde AG, Munich (DE)

( * ) Notice: Subject to any disclaimer, the term of this patent is extended or adjusted under 35 U.S.C. 154(b) by 447 days.

(21) Appl. No.: 13/146,517

(22) PCT Filed: Jan. 15, 2010

(86) PCT No.: PCT/EP2010/000215
§ 371 (c)(1),
(2), (4) Date: Jul. 27, 2011

(87) PCT Pub. No.: WO2010/086092
PCT Pub. Date: Aug. 5, 2010

(65) Prior Publication Data
US 2011/0284482 A1   Nov. 24, 2011

(30) Foreign Application Priority Data

Jan. 27, 2009   (DE) .......................... 10 2009 006 262

(51) Int. Cl.
*B01D 47/00* (2006.01)
*B01D 21/02* (2006.01)
*C10G 11/00* (2006.01)
*C10G 9/00* (2006.01)

(52) U.S. Cl.
CPC .............. *B01D 21/02* (2013.01); *C10G 11/00* (2013.01); *C10G 9/00* (2013.01)
USPC ................ 95/149; 95/197; 96/236; 96/243; 96/265

(58) Field of Classification Search
CPC ......... B01D 49/00; B01D 47/10; B01D 45/02
USPC .............. 95/195, 205, 197; 96/237, 238, 239, 96/236
See application file for complete search history.

(56) References Cited

U.S. PATENT DOCUMENTS 2,747,680 A    5/1956   Kilpatrick
2,827,125 A *  3/1958   Hall et al. ....................... 95/188

(Continued)

FOREIGN PATENT DOCUMENTS

WO         93/12200 A1    6/1993

OTHER PUBLICATIONS

International Search Report, dated May 26, 2010, issued in corresponding PCT/EP2010/000215.

*Primary Examiner* — Duane Smith
*Assistant Examiner* — Phillip Shao
(74) *Attorney, Agent, or Firm* — Millen, White, Zelano & Branigan, P.C.

(57) ABSTRACT

The invention relates to a process for separating off solid particles, in particular coke particles, from a water phase by means of gravity in a plant for generating hydrocarbons by cracking a hydrocarbonaceous feed, and also to a device for carrying out the process. In contrast to the prior art, the water phase is taken off predominantly from a point above the column bottom B via the outlet A. The first gravity separator 2 which is constructed as a multistage settling tank 2 is situated not beneath, but next to, the scrubbing water column 1. The bottom phase of the scrubbing water column 1 already acts as a part of the first gravity separator 2. Thus, via the outlet 5 in the column bottom B, a heavy water phase which is loaded with coke particles is already taken off and passed into the second gravity separator 3. This heavy water phase is further treated, together with the heavy water phase which is loaded with coke particles from the recesses 6 of the multistage settling tank 2. In this embodiment of the invention, the feed rate into the multistage settling tank 2 need not be controlled as in the prior art. The multistage settling tank 2 and the bottom phase of the quench column 1 form a communicating liquid system in which the same level of the water phase is established.

18 Claims, 2 Drawing Sheets

(56) References Cited

U.S. PATENT DOCUMENTS

Figure 1:
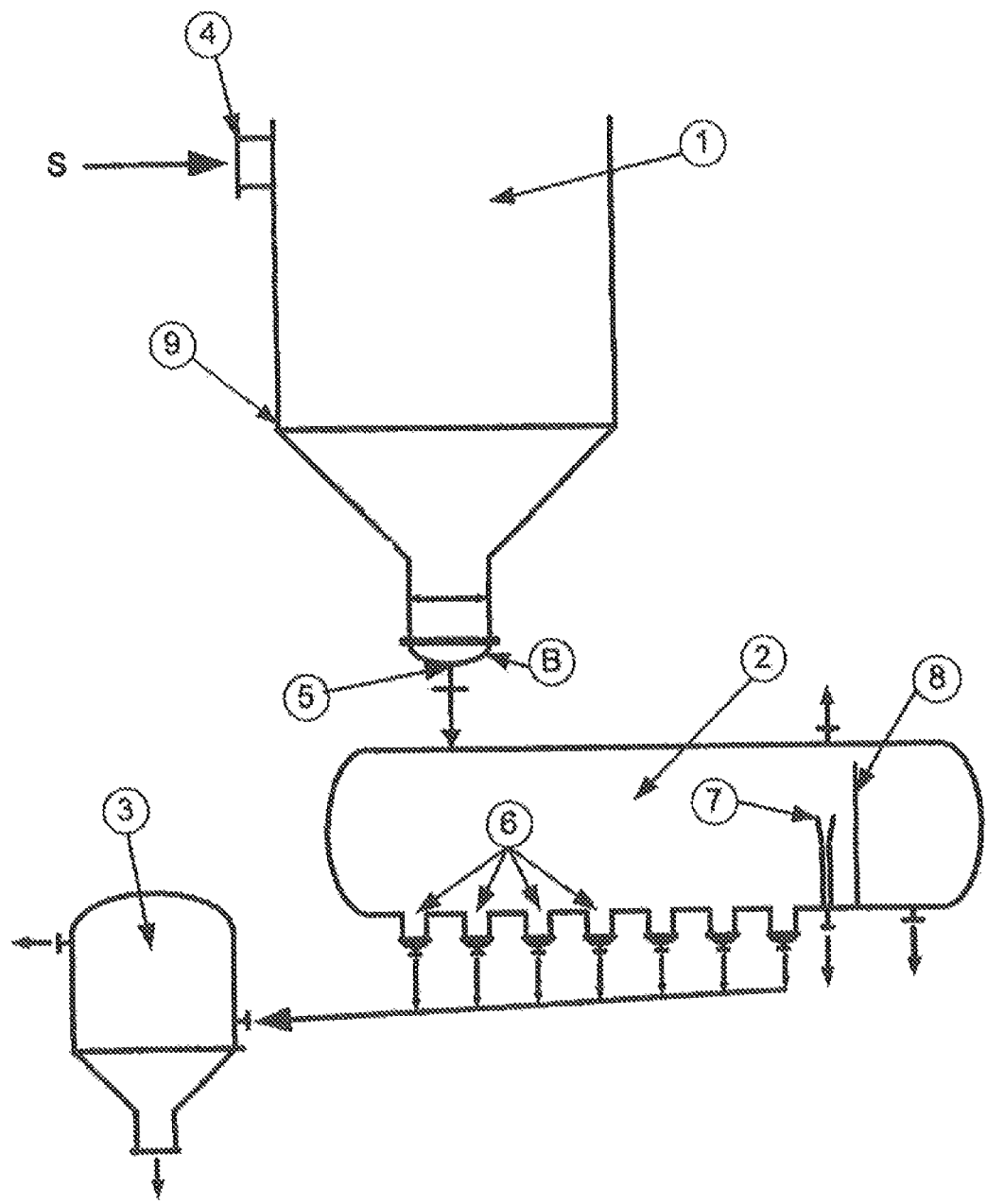

| | | | |
|---|---|---|---|
| 2,901,418 A | 8/1959 | Pappas | |
| 3,619,983 A * | 11/1971 | Rohr | 95/195 |
| 4,330,511 A * | 5/1982 | Nelson et al. | 423/210 |

* cited by examiner

PRIOR ART

PROCESS AND DEVICE FOR SEPARATING OFF SOLID PARTICLES FROM A WATER PHASE

The invention relates to a process for separating off particles, in particular coke particles, from a water phase by means of gravity in a plant for generating hydrocarbons by cracking a hydrocarbonaceous feed, and also to a device for carrying out the process.

In the context of this invention, particles which interfere with the process or hinder it, such as coke, tar, heavy oil or similar longer-chain hydrocarbons are summarized as, and termed, coke particles.

Plants for generating hydrocarbons by cracking a hydrocarbonaceous feed are also termed olefin plants. In an olefin plant, a hydrocarbonaceous feed is passed in the liquid or gaseous phase into a catalytic or thermal process. In this process the longer-chain hydrocarbons are converted to shorter-chain hydrocarbons. From the resultant shorter-chain hydrocarbons, the desired olefin products are subsequently separated out in a low-temperature decomposition part.

The invention will be described hereinafter using an ethylene plant as example, but is suitable in principle for any olefin plant in which solid particles, in particular coke particles, must be separated off from a water phase by means of gravity. In an ethylene plant, a gaseous feed is passed into a cracking furnace and thermally cracked. In the cracking, principally ethylene is formed which is separated off from the other hydrocarbons in the subsequent temperature decomposition part.

The hydrocarbonaceous feed is mixed in the ethylene plant with hot steam and passed into a cracking furnace. The hydrocarbon-steam mixture is passed through the cracking furnace in cracking tubes which are heated externally. The hydrocarbon-steam mixture is heated for fractions of seconds to temperatures of up to 800° C. At these temperatures the longer-chain hydrocarbons crack into shorter-chain hydrocarbons. In order to prevent an unwanted further reaction of the shorter-chain hydrocarbons, what is termed the cracked gas, downstream of the cracking furnace, must be cooled again as rapidly as possible. For cooling, the cracked gas is passed out of the cracking furnace into a quench column or scrubbing water column. In the quench column the cracked gas is simultaneously cooled and scrubbed by the contact with water.

Hereinbelow, the column in which the cracked gas is cooled and scrubbed directly downstream of the cracking furnace is termed a scrubbing water column.

The cracked gas is passed into the scrubbing water column at the bottom and flows through the scrubbing water column from bottom to top, and so the purified and cooled cracked gas leaves the scrubbing water column via the top of the column. The quench or scrubbing water is applied to the scrubbing water column via the top. Cracked gas and quench water therefore pass in countercurrent, which achieves an intense heat exchange and mass transfer. Typically, the scrubbing water column contains various sections having a plurality of chimney trays on which the water phase collects and can be taken off. In such a case each section is charged separately from the top with quench water, wherein a larger amount is applied to the bottom section.

In the scrubbing water column the cracked gas is not only cooled, but purified from solid particles, such as coke particles. During the thermal cracking in the cracking furnace, solid coke particles form which consist of agglomerates of longer-chain hydrocarbons. These solid particles are scrubbed out of the cracked gas by the quench water in the scrubbing water column.

According to the prior art, therefore, in the bottom phase of the scrubbing water column a water phase forms which has a high fraction of solid coke particles. This water phase containing the solid coke particles is taken off from the bottom phase directly via the column bottom.

The water phase which is loaded with solid coke particles and which is taken off from the bottom of the column contains the majority of the quench water which was applied to the column. In order to be able to reuse the water from the bottom phase of the column, the solid coke particles must be separated off. This proceeds according to the prior art in an ethylene plant via gravity separators. According to the prior art the first gravity separator used is a large multistage settling tank, also termed decanter. A multistage settling tank according to the prior art has a plurality of recesses. In order to ensure that the water phase which is taken off from the settling tank from a point above the recesses is free from solid coke particles, the settling tank must be dimensioned such that the residence time of the water phase in the settling tank is sufficiently long. Only with a sufficiently long residence time can all of the coke particles, which are moved by gravity, settle and collect in the recesses. In addition, in this multistage settling tank, the water phase separates from the light hydrocarbon phase which is taken off from a point above the take off of the water phase. For this reason, the multistage settling tanks according to the prior art, for the large amount of the water phase, must be dimensioned to be very large in diameter and length.

From the recesses of the settling tank there is taken off a water phase which has a significantly higher concentration of coke particles than was originally passed into the settling tank. This concentrated water phase is passed to the gravity separators of the second stage. The gravity separators of the second stage according to the prior art are one or more vessels having cone-shaped bottoms. The solid coke particles settle owing to gravity at the bottom in the cone-shaped part of the vessel. In the vessels having the cone-shaped bottom, therefore, a light phase forms at the top and a heavy phase in the bottom part of the cone. The density of the heavy phase in the bottom part of the cone can be further increased by serial connection of a plurality of such vessels. At the end, the heavy phase is removed from the plant.

Separating off the solid coke particles from the water phase according to the prior art has a number of disadvantages. The water phase which is loaded with solid coke particles from the bottom phase of the scrubbing water column occurs in a very large amount since a large amount of quench water is required for purification and especially for cooling of the cracked gas. Therefore, the first gravity separator which, according to the prior art, consists of a multistage settling tank must be constructed to be very large. Only in this manner may a sufficient residence time of the water phase loaded with solid coke particles be ensured. Only with a sufficiently long residence time can the coke particles settle in the recesses and a coke-particle-free water phase be obtained from the settling tank. This necessitates a high structural expenditure, since in this case not only must the actual settling tank be constructed so as to be very large, but also it must be arranged below the scrubbing water column. That is to say the in any case already high scrubbing water column must further be installed at a height of several tens of metres, in order to ensure that the take off from the bottom of the scrubbing water column is situated above the large settling tank.

The object of the present invention, therefore, is to design a process and also a device of the type mentioned at the outset which reduces the structural expenditure in an olefin plant.

The object in question is achieved in terms of the process by the fact that the water phase is taken off from the bottom phase of the scrubbing water column predominantly from a point above the column bottom.

According to the basic concept of the invention, the water phase is taken off from the bottom phase of the scrubbing water columns not, as in the prior art, via the column bottom, but predominantly from a point which is situated above the column bottom. By means of the process according to the invention, therefore, the entire bottom phase region of the scrubbing water column which is situated below the point from which the water phase is predominantly taken off can act itself as a gravity separator. The actual gravity separator into which the water phase which is taken off is passed can therefore be dimensioned so as to be smaller. In addition, the scrubbing water column no longer needs to be arranged above the first gravity separator, which markedly reduces the overall height and the associated integration heights of the plant components situated upstream or downstream of the scrubbing water column.

Preferably, the water phase is taken off above, particularly preferably at a height between half or the whole nominal width of the take off, the region where the shape of the column shell changes from cylindrical to conical. The lower region of the actually cylindrical quench column is conical in order to ensure falling of the coke particles to the lowest point of the quench column. The water phase is preferably taken off above the transition between cylindrical and conical shape of the column shell. Particularly preferably, the water phase is taken off at half to the whole height of the nominal width of the take off tube used above the transition region.

According to an advantageous embodiment of the invention, the water phase from the bottom phase of the scrubbing water column is passed into a first gravity separator which is preferably constructed as a multistage settling tank. In this embodiment of the invention the multistage settling tank can be constructed so as to be markedly smaller than in the prior art. The bottom phase of the scrubbing water column functions here entirely similarly to the first recess of the multistage settling tank. The multistage settling tank, in this embodiment, can therefore be shortened by at least the diameter of the scrubbing water column compared with the prior art for the same separation efficiency. In addition, the multistage settling tank can be arranged beside the bottom phase of the scrubbing water column, as a result of which the entire overall height is decreased. Likewise, the structures in order to arrange the scrubbing water column at a height of several tens of metres are dispensed with.

In a further embodiment of the invention, in addition, a heavy water phase which is loaded with coke particles is taken off via the bottom of the scrubbing water column and passed into a second gravity separator. Similarly to how the heavy water phase which is loaded with coke particles is taken off from the recesses of the multistage settling tank, in this embodiment the heavy water phase is taken off from the bottom phase of the scrubbing water column for further processing.

It has proved to be particularly advantageous to take off the heavy water phase which is loaded with coke particles from the first gravity separator, preferably from the recesses of the multistage settling tank, and pass it into the second gravity separator. The heavy water phase from the bottom phase of the scrubbing water column and the heavy phase from the multistage settling tank are further processed jointly in this manner.

In a device consisting of a scrubbing water column and at least one gravity separator, wherein the scrubbing water column has an outlet which has a direct flow connection to a first gravity separator, the object in question is achieved in that the outlet is arranged above the bottom of the scrubbing water column.

Preferably, the outlet is situated above, particularly preferably at a height between half or the whole nominal width of the take off, the region where the shape of the column shell changes from cylindrical to conical. The nominal width of the take off corresponds to the nominal width of the connection tube between quench column and first gravity separator.

Advantageously, the first gravity separator is constructed as a multistage settling tank. A multistage settling tank has a plurality of recesses in which the heavy coke particles can collect. In addition, the water phase and the light hydrocarbon phase separate here. The water phase is taken off via an outlet at a defined height above the recesses, the light hydrocarbon phase floating above is separated off via an overflow weir.

In one embodiment of the invention, the scrubbing water column has a second outlet in the column bottom, which outlet has a direct flow connection to a second gravity separator. Via the outlet in the column bottom, the heavy water phase which is loaded with coke particles from the bottom phase of the column can be passed into a second gravity separator for further treatment.

It has proved to be particularly advantageous that the second gravity separator has at least one direct flow connection to the first gravity separator. By this means the heavy water phases loaded with coke particles can be treated jointly.

By means of the present invention, it is possible, in particular, to reduce the structural expenditure in an olefin plant. Using the present invention, the necessity of arranging the scrubbing water column at a height of several tens of metres is eliminated. In addition, the multistage settling tank can be dimensioned to be significantly smaller than in the prior art for the same separation efficiency.

The invention will be described in more detail hereinafter with reference to a comparison of an embodiment of the invention with the prior art.

In the figures

Figure 2:
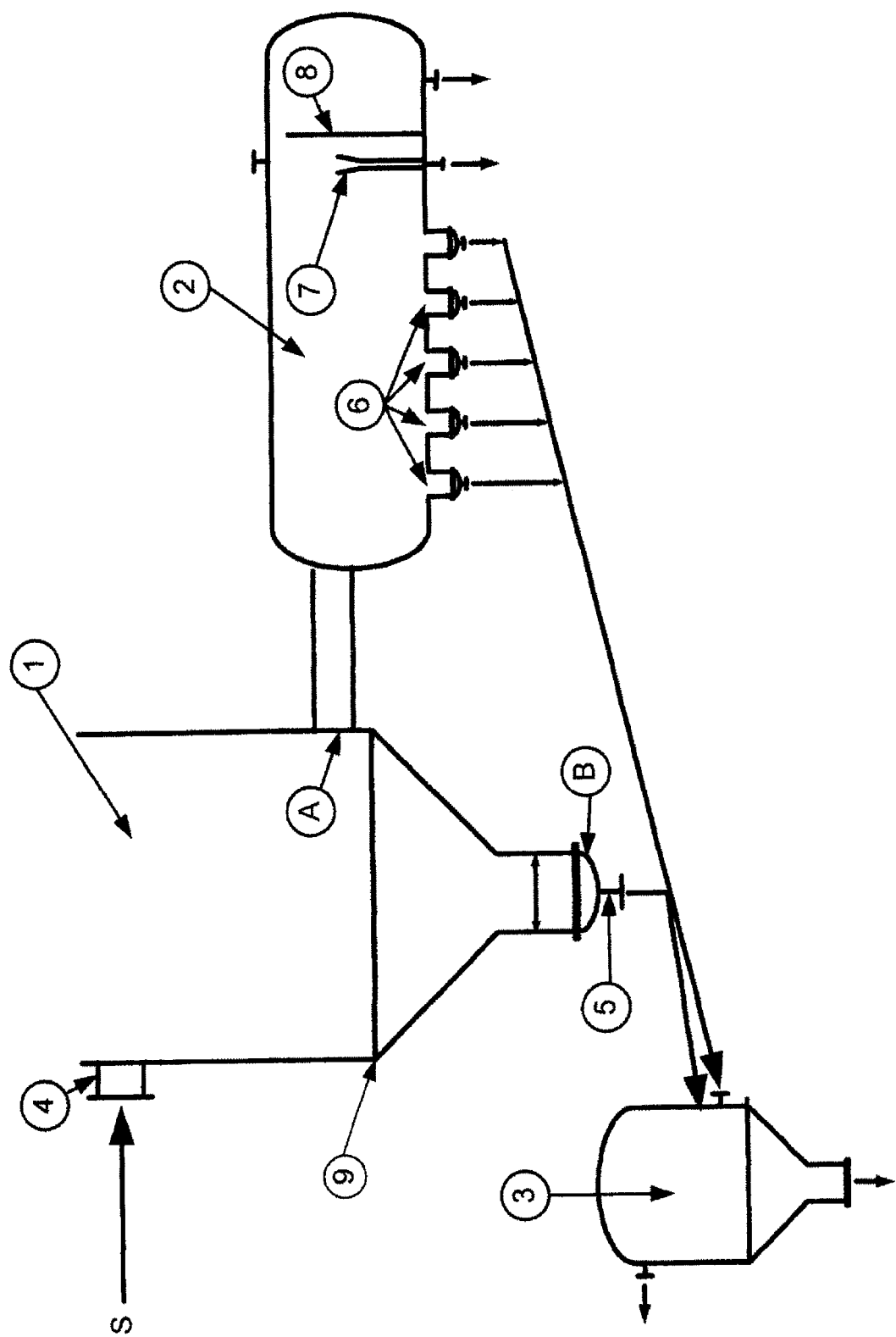

FIG. 1: shows a scrubbing water column having gravity separators according to the prior art FIG. 2: shows an embodiment of the invention FIG. 1 shows a scrubbing water column 1 having a first gravity separator 2 and a second gravity separator 3 according to the prior art. The first gravity separator is constructed as a multistage settling tank 2. The cracked gas S is passed into the scrubbing water column via the feed line 4. The cracked gas is cooled by the quench water (which is not shown) flowing from top to bottom and purified from heavy coke particles. In the bottom phase of the column a water phase which is loaded with coke particles forms. This is passed completely into the multistage settling tank 2 via the outlet 5 in the column bottom B. The multistage settling tank 2 has a plurality of recesses 6, an outlet 7 for the water phase and an overflow weir 8 for separating off the light hydrocarbon phase. The multistage settling tank 2 is dimensioned to be sufficiently large that the various phases can separate by means of gravity. The heavy coke particles collect in the recesses 6, and so here a heavy water phase which is loaded with coke particles forms. The light hydrocarbon phase floats on top and runs via the overflow weir 8 into a separate part of the multistage settling tank 2. The then purified water phase can be taken off from the multistage settling tank 2 via the outlet 7 and be recirculated to the scrubbing water column 1 as quench water. The heavy water phase which is loaded with coke particles from the recesses 6 of the multistage settling tank is passed into a second gravity separator 3. The gravity separator 3 consists of a simple vessel having a conical bottom. From the top of the gravity separator 3, a water phase can be taken off and, from the conical bottom, a still further thickened heavy water phase which is loaded with coke particles can be taken off.

According to the prior art, the water phase is taken off from the bottom phase of the scrubbing water column 1 via the column bottom B. The scrubbing water column 1 is situated above the multistage settling tank 2.

FIG. 2 shows an embodiment of the invention. In contrast to the prior art, the water phase is predominantly taken off from a point above the column bottom B via the outlet A. The first gravity separator 2 which is constructed as a multistage settling tank 2 is situated not below, but next to, the scrubbing water column 1. In this case the bottom phase of the scrubbing water column 1 already acts as part of the first gravity separator 2. Therefore, via the outlet 5 in the column bottom B, a heavy water phase which is loaded with coke particles is already taken off and passed into the second gravity separator 3. This heavy water phase, together with the heavy water phase which is loaded with coke particles from the recesses 6 of the multistage settling tank 2, is further treated. In this embodiment of the invention, the feed rate into the multistage settling tank 2 need not be controlled as in the prior art. The multistage settling tank 2 and the bottom phase of the quench column 1 form a communicating liquid system in which the same level of the water phase is established.

The invention claimed is:

1. A process for separating off particles from a cracked gas produced in a plant for generating hydrocarbons by cracking a hydrocarbonaceous feed, said process comprising:
   introducing said cracked gas into a scrubbing water column, said srubbing water column comprising a column shell and a bottom, and wherein, at a region adjacent the bottom of the scrubbing water column, the shape of the column shell changes from cylindrical to conical
   removing a water phase from a bottom region of said scrubbing water column via a take-off at a point above the bottom of said scrubbing water column,
   whereby said water phase is taken off from said scrubbing water column at a height between half or the whole nominal width of said take-off above said region where the shape of the column shell changes from cylindrical to conical, and
   whereby said water phase removed from said bottom region of said scrubbing water column is passed into a first gravity separator.

2. The process according to claims 1, wherein said first gravity separator is constructed as a multistage settling tank.

3. The process according to claim 1, further comprising removing a heavy water phase loaded with coke particles from the bottom of the scrubbing water column and passing said heavy water phase into a second gravity separator.

4. The process according to claim 2, further comprising removing a heavy water phase loaded with coke particles from the bottom of the scrubbing water column and passing said heavy water phase into a second gravity separator.

5. The process according to claim 2, further comprising removing a heavy water phase loaded with coke particles from said first gravity separator and passing said heavy water phase into a second gravity separator.

6. The process according to claim 3, further comprising removing a further heavy water phase loaded with coke particles from said first gravity separator (2), and passed into a second gravity separator.

7. The process according to claim 4, further comprising removing a further heavy water phase loaded with coke particles from said first gravity separator (2), and passed into a second gravity separator.

8. A device comprising:
   a scrubbing water column comprising a column shell and a bottom, and wherein, at a region adjacent the bottom of the scrubbing water column, the shape of the column shell changes from cylindrical to conical, and
   at least one gravity separator,
   wherein said scrubbing water column has an outlet which has a direct flow connection to a first gravity separator, wherein outlet is situated at a height between half or the whole nominal width of said outlet above said region where the shape of the column shell changes from cylindrical to conical.

9. The device according to claim 8, wherein said first gravity separator is constructed as a multistage settling tank.

10. The device according to claim 8, wherein said scrubbing water column has a second outlet in the bottom of said scrubbing water column, and said second outlet has a direct flow connection to a second gravity separator.

11. The device according to claim 9, wherein said scrubbing water column has a second outlet in the bottom of said scrubbing water column, and said second outlet has a direct flow connection to a second gravity separator.

12. The device according to claim 10, wherein the second gravity separator (3) has at least one direct flow connection to the first gravity separator (2).

13. The device according to claim 11, wherein the second gravity separator (3) has at least one direct flow connection to the first gravity separator (2).

14. A process for separating off particles from a cracked gas produced in a plant for generating hydrocarbons by cracking a hydrocarbonaceous feed, wherein said process is conducted in a device according to claim 8, said process comprising:
   removing a water phase from a bottom region of said scrubbing water column at a point above the bottom of said scrubbing water column,
   whereby the water phase is taken off via said outlet at a height between half or the whole nominal width of said outlet above said region where the shape of the column shell changes from cylindrical to conical, and
   whereby the water phase from said bottom region of said scrubbing water column is passed into said first gravity separator via said outlet which has a direct flow connection to said first gravity separator.

15. The process according to claims 1, wherein said particles are coke particles.

16. The process according to claim 5, wherein said first gravity separator is a multistage settling tank having recesses and said heavy water phase loaded with coke particles is removed from said recesses of said multistage settling tank.

17. The process according to claim 6, wherein said first gravity separator is a multistage settling tank having recesses and said further heavy water phase loaded with coke particles is removed from said recesses of said multistage settling tank.

18. The process according to claim 7, wherein said first gravity separator is a multistage settling tank having recesses and said further heavy water phase loaded with coke particles is removed from said recesses of said multistage settling tank.

* * * * *